United States Patent
Yli-Peltola (10) Patent No.: US 12,153,987 B2
(45) Date of Patent: Nov. 26, 2024

(54) RFID READER ANTENNA FOR USE IN AN INTELLIGENT CABINET

(71) Applicant: Stora Enso OYJ, Helsinki (FI)

(72) Inventor: Ilkka Yli-Peltola, Kangasala (FI)

(73) Assignee: Stora Enso OYJ, Helsinki (FI)

( * ) Notice: Subject to any disclaimer, the term of this patent is extended or adjusted under 35 U.S.C. 154(b) by 49 days.

(21) Appl. No.: 18/248,572

(22) PCT Filed: Oct. 12, 2021

(86) PCT No.: PCT/IB2021/059323
§ 371 (c)(1),
(2) Date: Apr. 11, 2023

(87) PCT Pub. No.: WO2022/079580
PCT Pub. Date: Apr. 21, 2022

(65) Prior Publication Data
US 2024/0020494 A1 Jan. 18, 2024

(30) Foreign Application Priority Data
Oct. 13, 2020 (SE) .................................... 2051189-5

(51) Int. Cl.
*G06K 7/10* (2006.01)
*H01Q 1/38* (2006.01)
(Continued)

(52) U.S. Cl.
CPC ..... *G06K 7/10346* (2013.01); *G06K 7/10415* (2013.01); *H01Q 1/38* (2013.01); *H01Q 1/48* (2013.01); *H01Q 9/40* (2013.01)

(58) Field of Classification Search
CPC .......... G06K 7/10346; G06K 7/10415; G06K 7/10445; G06K 19/0723; G06K 19/07773;
(Continued)

(56) References Cited

U.S. PATENT DOCUMENTS

2004/0056823 A1* 3/2004 Zuk .................. G06K 19/07749
343/895
2007/0046552 A1* 3/2007 Marino .................... H01Q 1/44
340/572.1
(Continued)

FOREIGN PATENT DOCUMENTS

WO 2020128937 A1 6/2020

OTHER PUBLICATIONS

International Search Report from corresponding PCT application No. PCT/IB2021/059323, mailed on Oct. 27, 2021.

*Primary Examiner* — Omar Casillashernandez
(74) *Attorney, Agent, or Firm* — Greer, Burns & Crain, Ltd.

(57) ABSTRACT

An RFID reader antenna (1) for use in an intelligent cabinet (2), such as a smart fridge, is disclosed. The antenna (1) is configured for operation within the UHF band and has omnidirectional radiation pattern and circular polarization. The antenna comprises a dielectric substrate (11), and a ground plane (12) provided on the dielectric substrate. An aperture (13) forms an open area within the bounds of the ground plane (12). A radiating element (14; 14'; 14''; 14'''; 14) is provided on the dielectric substrate in a plane parallel to the ground plane, and arranged within the open area, when viewed from a direction perpendicular to the ground plane (12), and surrounded by the ground plane.

16 Claims, 8 Drawing Sheets

(51) Int. Cl.
  *H01Q 1/48* (2006.01)
  *H01Q 9/40* (2006.01)
(58) Field of Classification Search
  CPC .. H01Q 1/38; H01Q 1/48; H01Q 9/40; H01Q 1/2208; H01Q 1/2216; H01Q 1/36; G06Q 10/08
  USPC ........................................................ 340/572.7
  See application file for complete search history.

(56) References Cited

U.S. PATENT DOCUMENTS

| | | | | |
|---|---|---|---|---|
| 2008/0052037 | A1* | 2/2008 | Bodin | G06Q 20/203 709/217 |
| 2011/0175503 | A1* | 7/2011 | Chamarti | H05K 7/1488 211/26 |
| 2018/0089475 | A1* | 3/2018 | Hattori | H04B 5/24 |
| 2019/0173267 | A1* | 6/2019 | Robinson | H02B 1/306 |

* cited by examiner

RFID READER ANTENNA FOR USE IN AN INTELLIGENT CABINET

This application is a U.S. National Phase under 35 U.S.C. § 371 of International Application No. PCT/IB2021/059323 filed Oct. 12, 2021, which claims priority under 35 U.S.C. §§ 119 and 365 to Swedish Application No. 2051189-5 filed Oct. 13, 2020.

TECHNICAL FIELD OF THE INVENTION

The present invention is related to a radio frequency identification (RFID) reader antenna useable in an intelligent cabinet, as well as an intelligent cabinet having such a RFID reader antenna.

BACKGROUND

RFID tags are nowadays used more and more frequently, and for a wide variety of applications, such as in smart labels/tags. The RFID tag is conventionally arranged as a flat configured transponder, e.g. arranged under a conventional print-coded label, and includes a chip and an antenna. Smart labels offer advantages over conventional barcode labels, such as higher data capacity, possibility to read and/or write outside a direct line of sight, and the ability to read multiple labels or tags at one time. It is also known to incorporate RFID labels directly in a packaging material, to form so-called intelligent packaging products.

One application for RFID tags which is becoming increasingly interesting is in packages comprising food products and the like, There is a recent trend to turn traditional convenience stores into self-service fulfilment centres located regionally or locally, close to homes, workplaces, transport hubs and leisure activities. To this end, unmanned, intelligent cabinets may be used, such as intelligent fridges and the like.

The intelligent cabinets may be used to sell, in an automated way, various products such as consumer products, groceries, beverages, snacks etc. Each product in the intelligent cabinet is equipped with an RFID tag.

The shopping process in an intelligent cabinet is typically the following:

Authentication of a consumer, e.g. done by the consumer using his smartphone and a smartphone app. Hereby, the consumer is identified and a connection to the consumer's personal payment account or the like is established. When the consumer has been authenticated, the system will send a command to an electric lock of the intelligent cabinet to open the locked door.

The consumer may then open the door and pick out the products he wants to purchase, and thereafter close the door.

When the door is closed, the system will run an inventory round inside the intelligent cabinet. Since each product is RFID tagged with tags with individual identification codes (for example Electronic Product Code, "EPC" or Unique Identifier ("UID"), the system will detect which products are still inside the cabinet, and determine which product(s) that are missing compared to the previously made inventory round.

The system may then display the purchased items and their cost, e.g. on a display on the intelligent cabinet.

The system will then charge the corresponding amount from the consumer's payment account, and may also send a receipt to his mobile device.

The cabinet is then ready to receive the next user.

The system always knows the inventory of the cabinet. When the inventory levels are determined to be low, the system will trigger a replenishment cycle. Therefore, a replenishment batch of products may be delivered to the intelligent cabinet from a centralized warehouse, distribution center or the like.

Intelligent cabinets may be used in various locations, such as in office buildings, fitness and sport centers, schools, hotels, gas stations, and the like. Kiosks and small convenience stores can also be converted into fully digitalized unmanned stores with no personnel by use of such intelligent cabinets. With an offering of 10-15 intelligent cabinets, a small store can provide an assortment that represents a typical traditional kiosk. In facilities that have limited opening hours, such as lunch restaurants, cafés and the like, intelligent cabinets may be used intelligent cabinets can offer a basic offering of food, snacks and daily goods outside the opening hours.

The intelligent cabinets can be arranged for indoor use, but may also be designed for outdoor use and tough conditions.

Such an intelligent cabinet is e.g. disclosed in WO 2020/128937.

However, there is currently a problem to produce intelligent cabinets in a cost-effective way, and thereby to make the cabinets affordable. A particular problem is how to ensure that all the RFID tags of the products in the cabinet can be accessed and read by a reader. In present cabinets, this has been solved by using a plethora of readers in parallel. Typically, up to 16 antennas are needed to provide good read zone coverage inside a cabinet. The presently used antennas are also relatively large and costly to produce. Not only does this make the overall cabinet system costly, but also reduces the space available in the cabinet for the consumer products. Further, many of the presently used antennas are sensitive to the electric properties of the materials used as parts of the cabinet, such as the shelves, which could lead to attenuation of the signals, non-functional antennas, etc. In particular, this means that the antenna would typically need to be specifically designed for every type of shelf. The consumer products arranged in the cabinet may also affect the antennas in a similar way. The antennas are also generally sensitive to reflections from the cabinet walls. Since the cabinet is an RF shielded construction, most of the RF power is contained inside the cabinet, and much of the radiated RF power is reflected back to the antennas. This makes proper readings from the RFID tags more difficult.

There is therefore still a need for an improved RFID reader tag antenna, which can be produced cost-efficiently, and/or which has better performance and properties. There is also a need for an improved intelligent cabinet, alleviating the problems discussed in the foregoing.

SUMMARY

It is therefore an object of the present invention to provide an RFID reader antenna for an intelligent cabinet, as well as an intelligent cabinet having such an RFID reader antenna, which alleviate at least part of the above-discussed problems, and at least partially address one or more of the above-mentioned needs.

This object is obtained by means of an RFID reader arrangement and an intelligent cabinet in accordance with the appended claims.

According to a first aspect of the invention, there is provided an RFID reader antenna for use in an intelligent cabinet, the antenna being configured for operation within the UHF band, the antenna comprising:
- a dielectric substrate;
- a ground plane provided on the dielectric substrate, said ground plane having an aperture forming an open area within the bounds of the ground plane; and
- a radiating element provided on the dielectric substrate in a plane parallel to said ground plane, the radiating element being arranged within the open area, when viewed from a direction perpendicular to said ground plane, and surrounded by the ground plane.

It has been found by the present inventor that this antenna works very well in the closed environment of an intelligent cabinet. It has also been found that this antenna can be produced very cost-efficiently, and typically with a production cost of less than $\frac{1}{100}$-$\frac{1}{50}$ of the cost for presently used antennas. It has also been found that this antenna can be made very thin, thereby taking up very little space inside the cabinet. The antenna is preferably planar, and is well suited to be connected to or integrated with shelves of the cabinet. Still further, the antenna has very good performance and properties, making it possible to cover the entire cabinet with only one, or only a few, antennas.

The RFID reader antenna may be used in any type of intelligent cabinet, such as in an intelligent/smart fridge, but also in other types of cabinets where automated inventory management is used or needed. The cabinet may be retail or industrial cabinet.

The RFID reader antenna is an antenna for use internally within a cabinet, and which transmits and receives signals from RFID tags located inside the cabinet. The RFID reader antenna may operate within the Ultra High Frequency (UHF) band, and in particular in a band within the range of 750-1400 MHz, and preferably within the range of 860-960 MHz.

The new RFID reader antenna functions as a, preferably planar, circular polarized monopole, and provides wideband characteristics and an omni-directional radiation pattern. This makes it very well suited for use in an intelligent cabinet, and enables reading of RFID tags within a large space around the antenna.

It has also been found that a good level of impedance matching, radiation efficiency and circular polarization axial ratio is obtained by the new RFID reader antenna, and that these excellent properties can be maintained over at least a frequency band ranging from 750 to 1400 MHz. This enable a wideband operation, which can efficiently compensate against any de-tuning occurring due to close-by materials.

The omni-directional pattern of the new RFID reader antenna means that antenna simultaneously radiates in multiple directions, and, importantly, also towards the top and bottom, i.e. in direction perpendicular to the plane of the antenna. Hereby, an individual antenna can read tags from several shelves. This makes it possible to cover the entire cabinet with fewer antennas, and also makes it possible to have overlapping reading zones, thereby making the system more redundant. The omni-directionality also leads to low gain/directivity, and hereby amplitude of reflected signals is lower than with high gain directional antennas.

Thus, the new RFID reader antenna is relatively simple and cost-effective to manufacture, and can be made very thin, thereby taking up little space. Due to the circular polarization, it is also insensitive to the orientation of the RFID tags to be read.

The new RFID reader antenna also has an improved tolerance to various kind of shelf materials, when arranged on or in a shelf, leading to better re-use for different shelf constructions and applications. It could e.g. be retrofitted to shelves from different manufacturers, retrofitted to shelves of old cabinets, etc.

The new RFID reader antenna also has improved stability and reflection handling.

The aperture may have many different shapes. However, preferably the aperture has a rounded circumference, and preferably in the shape of a circle, ellipse or oval. This improves the circular polarization properties of the antenna.

In an embodiment, the ground plane is arranged on a first side of the dielectric substrate, and the radiating element is arranged on a second side of the dielectric substrate, said first and second sides being opposite to each other. This facilitates production.

The dielectric substrate can essentially be of any non-conductive material, such as glass, paper, board, polymer film, textile and non-woven material. However, preferably the dielectric substrate is a printed circuit board (PCB) or a flexible PCB (FPC). In case the ground plane and the radiating element are arranged on different sides of the substrate, the PCB of FPC may be printed on both sides.

The antenna, including the ground plane and the radiating element, may be made of any material, as long as the material is conductive. The ground plane and the radiating element may be made by the same material, but may alternatively be made of different materials. For example, the ground plane and/or the radiating element may be formed by aluminum, but other metals, such as silver, and alloys may also be used. Forming of the ground plane and the radiating element on the substrate can be made in various ways, as is per se known in the art, such as by printing with conductive ink, such as silver ink, by first providing a conductive layer on the substrate and subsequently removing or forming this conductive layer into the desired shape, e.g. by means of grinding, cutting, etching or the like.

The antenna is preferably configured for operation within the range of 700-1400 MHz, and most preferably within the range of 860-960 MHz.

The radiating element may be shaped as a concave region, and preferably in the form of a lune. A concave region is here to be understood as a region/area where at least one segment, such as a part of a straight line, between two different points in the region/area are not fully included in the region/area, but are partly outside of it. This is e.g. the case in an area formed as a C, where the segment between the two ends would not be included. Thus, this segment is not a subset of the region/area. This is different from a convex region, where all segments between any two distinct points of the region are completely included in the shape, i.e. form subsets of the region.

Various realizations of concave regions for the radiating element are feasible, such as a circular area with an empty sector. However, in a preferred embodiment, the concave region is formed of two rounded arcs, and preferably two circular arcs, defining an apex at the intersection on each side. In particular, the radiating element may have the geometrical shape of a lune, such as the shape of a crescent moon. A crescent shape is a lune shape which does not include the center of the circle on which the outer arc is arranged, whereas a lune shape is to be understood more generally. A lune shape should here be construed as a region/area having one boundary portion for which the connecting segment of any two nearby points moves outward from the region and another boundary portion for which the connecting segment of any two nearby points moves inwardly towards the region. Alternatively put, a lune may be defined as the relative complement of one disk in another, where the two disks intersect but neither is a subset of the other. This may mathematically be formulated as a lune being A−A∩B, where A and B are disks which intersect, but neither is a subset of the other.

In some embodiments, the radiating element may be referred to as moon shaped.

In an embodiment, a feed line may be connected to an apex of the concave region.

The RFID reader antenna preferably comprises a feed line, forming an electric connection between an RF connector and the radiating element. In an embodiment, the feed line comprises an integrated loop, and preferably a DC short circuit loop, arranged in the vicinity of the RF connector. This enable an antenna detection feature for the RFID reader. This detection method is based on measuring the presence of DC (direct current) short circuit in the antenna. The integrated loop does not affect the antenna operation at UHF RFID frequencies, such as at about 900 MHz. Thus, the integrated loop provides an integrated antenna detection feature The feed line and the radiating element further preferably provide at least one of: an impedance within the range of 40-60Ω, such as about 50Ω, at the frequency of operation, and a reflection loss of equal to or less than −10 dB. The matching of the impedance and/or reflection loss can be made in various ways. However, preferably this is realized solely through the shape and dimensions of the feeding line, such as the length and/or width of the feeding line, i.e. without any additional components.

The radiating element is preferably arranged free from any overlap with the ground plane, i.e. fully within the bounds of the perimeter of the aperture, when viewed from a direction perpendicular to said ground plane.

Further, for at least 50% of the length of the perimeter of the radiating element, the distance between any point of the perimeter and the part of the ground plane being closest to said point is within the range 2-50 mm, and preferably 5-40 mm, and most preferably 10-30 mm. Put differently, that the width of the gap formed between the perimeter of the aperture and the perimeter of the radiating element is within the range of 2-50 mm, and preferably 5-40 mm, and most preferably 10-30 mm, over at least half of the circumference. Hereby, a well-defined and adequate electromagnetic coupling is obtained between the radiating element and the ground plane.

The ground plane preferably has a dimension in its longest direction within the range 100-300 mm, and preferably 150-300 mm, and more preferably 200-280 mm, and most preferably 230-270 mm. In a preferred embodiment, the ground plane is generally rectangular, whereby the longest direction constitutes the length direction.

The radiating element has a dimension in its longest direction within the range 50-200 mm, and preferably 80-160 mm, and more preferably 100-150 mm, and most preferably 120-140 mm. As discussed in the foregoing, the radiating element may be in the form of a moon, or a part sized moon, whereby the dimension in the longest direction corresponds to the diameter of the moon.

The overall dimensions of the RFID reader antenna may be kept very limited. For example, the length may be less than 35 cm, such as less than 30 cm, such than less than or equal to 25 cm. The width may be less than 25 cm, such as less than 20 cm, such as less than or equal to 18 cm. The thickness may be less than 5 mm, such as less than 2 mm, such as less than 1 mm.

The RFID reader arrangement may comprise only the dielectric substrate and the one or two metal layers forming the ground plane and the radiating element. However, one or both sides of the antenna may further be covered with a protective plastic material or the like. For example, the entire antenna may be enveloped in a protective plastic material. In one embodiment, the substrate and the metal layer(s) are over-molded in a plastic material.

The RFID reader antenna may be arranged to communicate with RFID tags that are passive, i.e. which are powered by the reader's electromagnetic field, or active, i.e. powered by an onboard battery.

According to another aspect of the present invention, there is provided an intelligent cabinet comprising a housing with an internal cavity, and at least one RFID reader antenna of the type discussed in the foregoing arranged within said internal cavity.

The at least one RFID reader antennas may here be arranged connected to or integrated with a shelf of said cabinet. In addition, more than one RFID reader antenna may be provided, such as on a plurality of shelves, and/or several antennas on one or each shelf. In a preferred embodiment, each shelf of the cabinet is provided with at least one RFID reader antenna, and preferably 1-3 antennas per shelf, and most preferably 1-2 antennas per shelf.

The antennas are preferably connected to the bottom of the shelves. Hereby, the antennas become more invisible, and also more protected against damage and the like. For example, the antennas may be connected to the shelves by screws arranged in the corners of the antenna, or elsewhere. However, the antennas may also be connected to the shelves in other ways, such as by adhesive, or by being integrally formed in the shelves.

It will be appreciated that the above-mentioned detailed structures and advantages of the first aspect of the present invention also apply to the further aspects of the present invention.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description preferred embodiments of the invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention, such as the thickness of various layers, the relative dimensions of the ground plane and the radiating element, etc.

As will be discussed in more detail in the following, the invention relates to an RFID reader antenna 1, which is planar, has an omni-directional radiation pattern, and which has circular polarization. The RFID reader antenna is particularly suited for use in an intelligent cabinet. However, the antenna may also be used in other contexts, such as in storage rooms, retail facilities, convenience stores, etc. The antenna is particularly useful for shielded compartments, and or relatively limited size.

Figure 1:
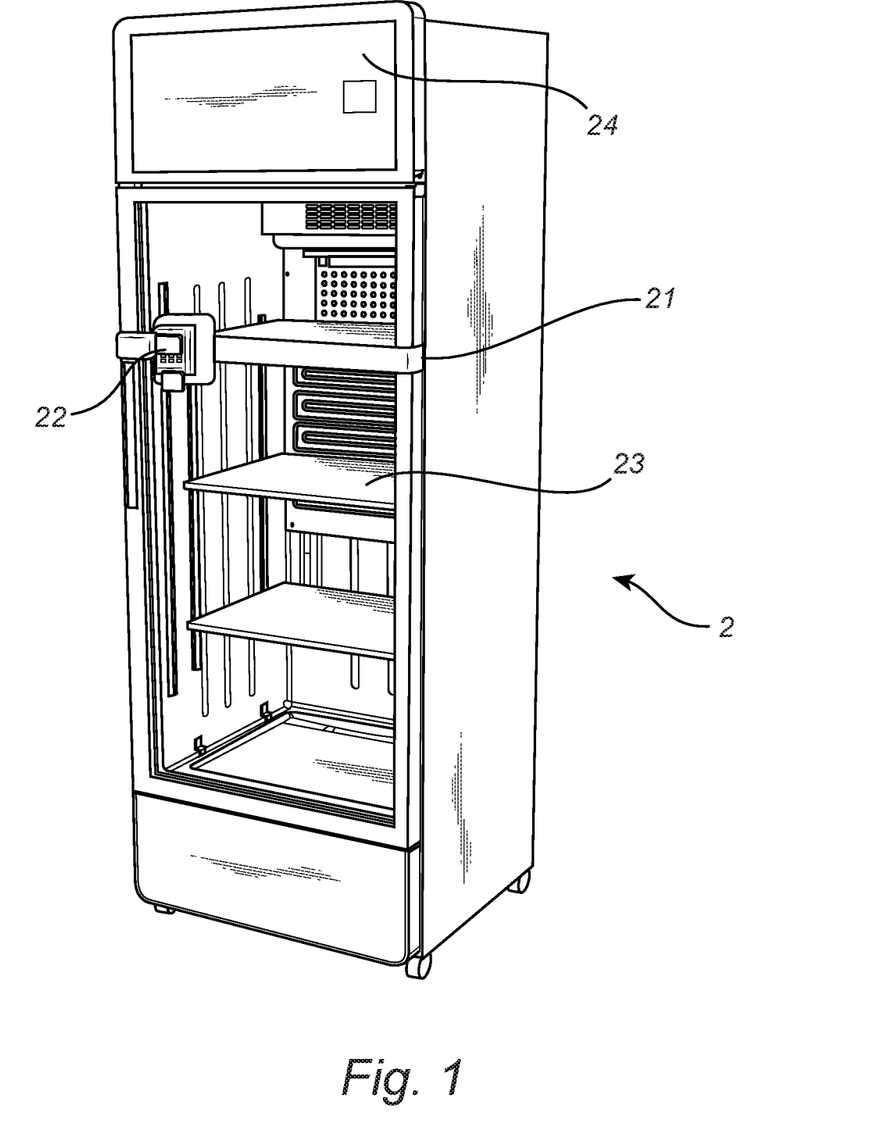
FIG. 1 is a schematic perspective view of a intelligent cabinet in accordance with an embodiment of the present invention.

With reference to FIG. 1, an intelligent cabinet 2 may comprise a housing, provided with a door 21 with a remotely controlled lock 22. The cabinet may further be provided with at least one shelf 23, and preferably a plurality of shelves. The cabinet may further be provided with an externally facing display 24.

In the illustrative embodiment, the intelligent cabinet is a smart fridge.

However, the cabinet may also be a smart refrigerator, or a cabinet for storage of products at room temperature, or even at somewhat elevated temperatures.

The intelligent cabinet may comprise a purchase identification system (not shown) for identifying the consumer and connecting to the consumer's personal payment account. This is typically done by consumer using his personal mobile device, e.g. a smartphone, e.g. to scan a QR code shown on the smart fridge display. The QR code may launche a mobile app (e.g. Alipay, Wechat Pay, MobilePay, Swift or similar) on the mobile device and thus identifying the consumer. However, as would be appreciated by the skilled reader, the other types of identifying methods and payment methods are possible e.g. via the consumer's credit card.

The intelligent cabinet is arranged to house a storage for RFID tagged products. Each product preferably having a package, wherein each product packaging is equipped with an RFID tag with individual identification codes (for example Electronic Product Code, "EPC" or Unique identifier "UID". The intelligent cabinet further comprises a lockable door 21, which is openable after identification of the consumer.

Further, the intelligent cabinet comprises an RFID reader and an antenna for reading the RFID tagged products in the storage of the intelligent cabinet.

The RFID reader is connected to a software system of the intelligent cabinet, such that the system can detect and identify what products are inside the cabinet. As the system also knows what items were inside the cabinet before the consumer opened the door, it can deduct which products the consumer took out (=purchased). Based on this, the system can consequently determine which exact product ID's the consumer purchased.

A purchase procedure may typically be made as follows:
Identifying the consumer via the consumer's mobile device, e.g. a smartphone. A preferred method is that the consumer using his smartphone to scan a QR code shown on the display 24 of the intelligent cabinet. The QR code launches a mobile app (such as Alipay, Wechat Pay, MobilePay, Swift or similar) on the consumer's mobile device and connecting to the consumer's personal payment account. However, other types of identifying methods are possible e.g. via the consumer's credit card.

After identifying of the consumer, the system will open the lock 22, thereby unlocking the locked door 21 to the cabinet, such that the consumer can open the door. When the door is open the consumer can pick out desired products with packaging from the cabinet. Each product packaging is preferably equipped with an RFID tag with individual identification codes (for example Electronic Product Code, "EPC" or Unique identifier "UID".

Thereafter, the consumer closes the door 21 and the door locks automatically.

When the door 21 is locked the system will automatically run an inventory round to detect which products with packaging that have been picked out from the cabinet by the consumer.

The system will thereafter automatically charge the cost for the purchased products from the consumer's payment account and sending a receipt to the mobile device.

The RFID reader antenna may be arranged in various places in the cabinet. Further, more than one RFID reader antenna may be provided within the cabinet. Preferably, the RFID reader antenna(s) are arranged to have its/their reading zones covering the entire interior space of the cabinet, and preferably with an overlap so that at least some positions, and preferably most positions, and most preferably all positions within the cabinet are covered by at least two antennas.

Figure 2:
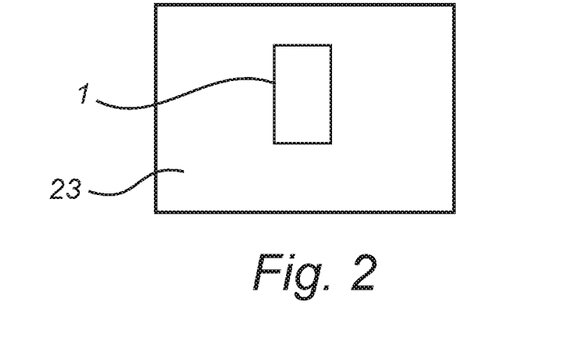
FIG. 2 is a schematic plan view from below of a shelf of the intelligent cabinet of FIG. 1, provided with one RFID reader antenna, in accordance with an embodiment.
Figure 3:
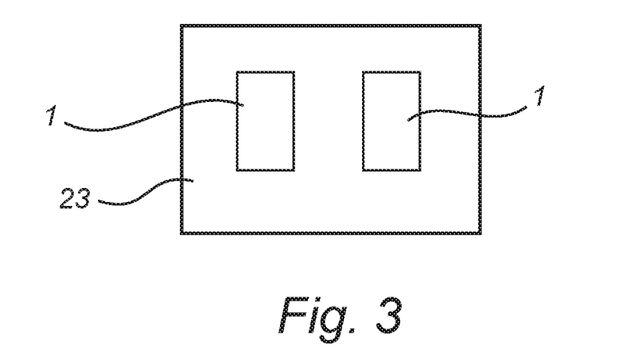
FIG. 3 is a schematic plan view from below of a shelf of the intelligent cabinet of FIG. 1, provided with two RFID reader antenna, in accordance with another embodiment.

In a preferred embodiment, the at least one RFID reader antenna 1 may be arranged connected to or integrated with a shelf 23 of the cabinet 2. In the illustrative example of FIG. 2, a single RFID reader antenna 1 is arranged on the bottom of a shelf 23. In an alternative embodiment, as illustrated in FIG. 3, two RFID reader antennas 1 are provided on the bottom of the shelf 23. In large cabinets, with very wide shelves, more than two RFID antennas may also be provided, such as three or four antennas, or even more. Preferably, each shelf 23 of the cabinet is provided with at least one antenna 1. Alternatively, or additionally, one or more RFID reader antenna(s) 1 may also be provided at other locations in the cabinet, such as in or on the roof, in or on the floor, or in or at the side walls.

The antennas are preferably connected to the bottom of the shelves.

Hereby, the antennas become more invisible, and also more protected against damage and the like. For example, the antennas may be connected to the shelves by screws arranged in the corners of the antenna, or elsewhere. However, the antennas may also be connected to the shelves in other ways, such as by adhesive, or by being integrally formed in the shelves.

The RFID reader antenna will now be discussed in more detail, with reference to FIG. 4.

The antenna is configured for operation within the UHF band, for transmitting and receiving signals from RFID tags located inside the cabinet. The RFID reader antenna may in particular operate in a band within the range of 750-1400 MHz, and preferably within the range of 860-960 MHz.

The antenna 1 comprises a dielectric substrate 11. The substrate 11 may be rectangular. However, many other shapes are also feasible. The dielectric substrate can essentially be of any non-conductive material, such as paper, board, polymer film, textile and non-woven material. However, preferably the dielectric substrate is a printed circuit board (PCB) or a flexible PCB (FPC).

On one side of the dielectric substrate 11 there is provided a ground plane 12, of a conductive material. The ground plane may have a rectangular shape. However, many other shapes are also feasible. Further, the ground plane is preferably arranged to have the same dimensions, or almost the same dimension, as the dielectric substrate.

The ground plane is further provided with an aperture 13 forming an open area within the bounds of the ground plane. The open is hereby defined by the perimeter 131 defining the boundary to the ground plane 12. The aperture is preferably circular, or generally circular, in shape, as in the illustrative example. However, other shapes are also feasible. However, preferably the aperture has a rounded circumference, and preferably in the shape of a circle, ellipse or oval.

The antenna 1 further comprises a radiating element 14 provided on the dielectric substrate 11 in a plane parallel to the ground plane 12. The radiating element 14 may be provided on the same side of the substrate 11 as the ground plane 12, and in the same plane as the ground plane.

However, alternatively, the radiating element 14 may be provided on one side of the dielectric substrate 11, and the ground plane 12 on another, parallel and opposed, side of the dielectric substrate. Thus, even though the ground plane 12 and the radiating element 14 in the illustrative example of FIG. 4 are illustrated as being in the same plane, they may alternatively be arranged in different planes, and for example on different sides of the dielectric substrate 11.

The radiating element 14 is arranged within the open area, formed by the aperture 13, when viewed from a direction perpendicular to the ground plane 12, and, thus, surrounded by the ground plane 12. This provides a certain separation between the radiating element and the ground plane, but may still allow some electro-magnetic coupling between the radiating element 14 and the ground plane 12.

The radiating element may be shaped as a concave region, and preferably in the form of a lune. In the illustrative example of FIG. 4, the radiating element is formed as a lune, having a shape defined by an outer arc 141 and an inner arc 142. The two arcs define a shape of a crescent, with defined apexes at the intersections. In the illustrative example of FIG. 4, the two arcs have different radiuses of curvature, with the inner arc having a lower radius of curvature.

However, the radiating element may be shaped in many alternative ways.

Figure 6A:
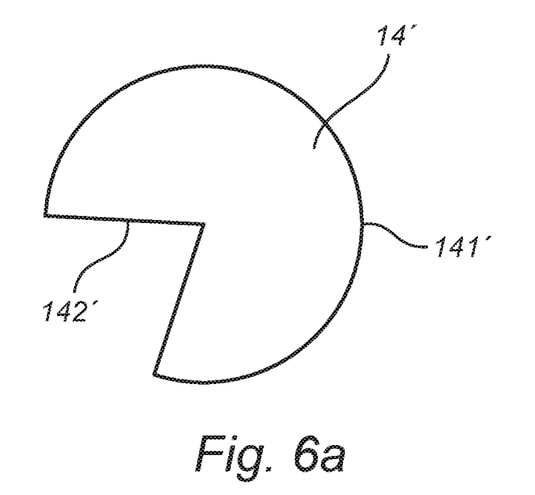
FIGS. 6a-d are top plan views of alternatively embodiments of the radiation element of the antenna of FIG. 4.

For example, as illustrated in FIG. 6a, the radiating element 14' may be formed as a circular area, with a circular outer arc 141', and with an empty sector, defining an inner boundary 142' defining two radially extending lines with an angle therebetween. The angle may in this case be acute or obtuse, or even perpendicular.

Figure 6B:
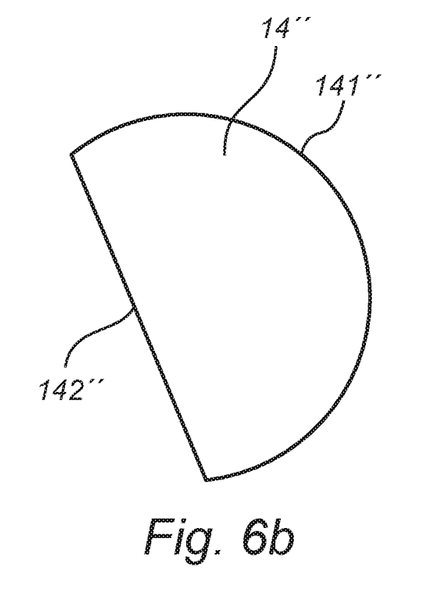

Further, as illustrated in FIG. 6b, the inner boundary 142" of the radiating element 14" may be defined by a straight or somewhat curved line, cutting off the circle defined by the outer boundary 141".

Figure 6C:
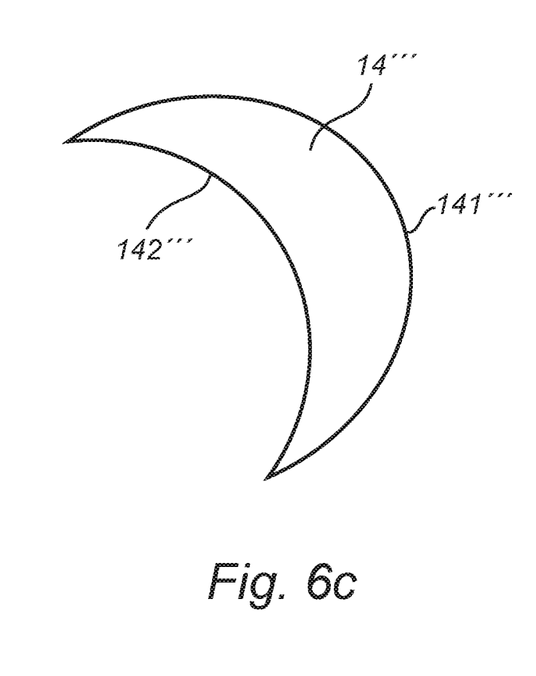

As a further alternative, as illustrated in FIG. 6c, the outer boundary 141''' and the inner boundary 142''' of the radiating element 14''' may have the same radius of curvature.

Figure 6D:
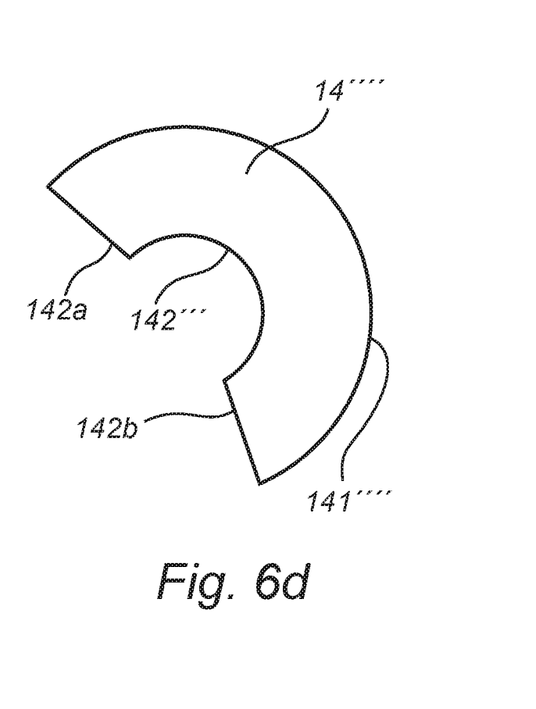

As yet another alternative, the radiating element 14'''' may be generally shaped as a C. In this embodiment, the outer boundary 141'''' is formed as a generally circular arc. The inner boundary is formed as an inner circular arc 142'''', but with relatively radially extending, relatively straight parts 142a and 142b at the ends.

However, other shapes of the radiating element are also feasible, as would be appreciated by the skilled reader.

The radiating element 14 is preferably arranged free from any overlap with the ground plane 12, i.e. fully within the bounds of the perimeter 131 of the aperture 13, when viewed from a direction perpendicular to the ground plane 12.

Further, for at least 50% of the length of the perimeter of the radiating element, the distance between any point of the perimeter and the part of the ground plane being closest to said point is within the range 2-50 mm, and preferably 5-40 mm, and most preferably 10-30 mm. Put differently, that the width of the gap formed between the perimeter of the aperture and the perimeter of the radiating element is within the range of 2-50 mm, and preferably 5-40 mm, and most preferably 10-30 mm, over at least half of the circumference. Hereby, a well-defined and adequate electromagnetic coupling is obtained between the radiating element and the ground plane. Thus, the smallest and largest distance between the boundary formed by 141, 141', 141", 141''' and 141'''' and the perimeter 131 of the aperture preferably meet these conditions.

Further, a feed line 15 may be connected to an apex of the radiating element 14. The feed line 15 forms an electric connection between an RF connector 16 and the radiating element 14. The RF connector may e.g. be realized as a connection pad, or connection area. Another RF connector may be connected to the ground plane 12. In one embodiment, the connection pads/areas may be connected to a coaxial connector, such as SubMiniature version A (SMA) connector.

Figure 4:
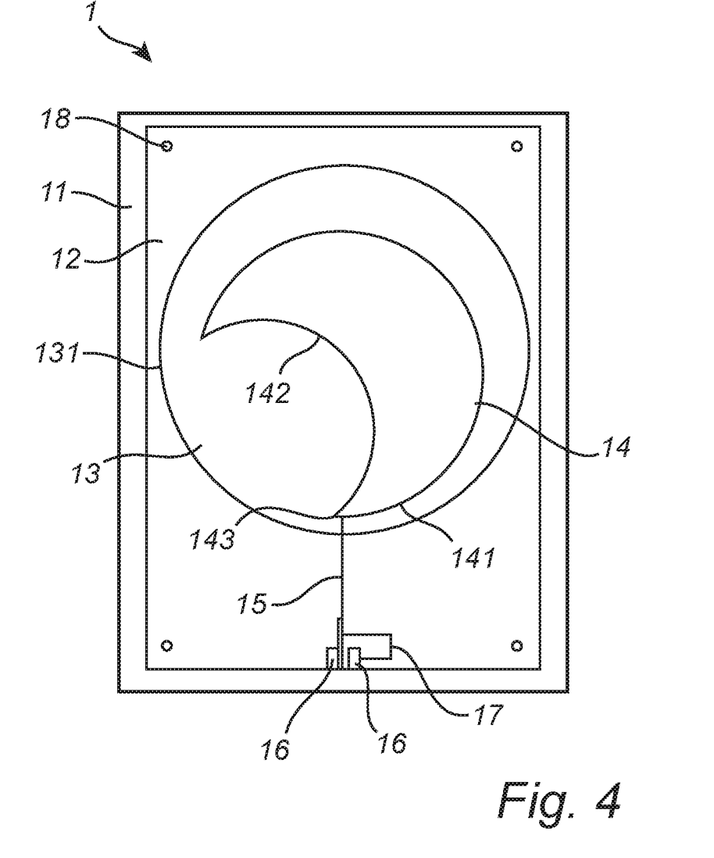
FIG. 4 is a top plan view of an RFID reader antenna in accordance with an embodiment of the present invention.

In the embodiment illustrated in FIG. 4, the feed line 15 comprises an integrated loop 17, forming a DC short circuit loop, arranged in the vicinity of the RF connector. This enable an antenna detection feature for the RFID reader.

The feed line and the radiating element further preferably provide an impedance within the range of 40-60Ω, such as about 50Ω, at the frequency of operation, and a reflection loss of equal to or less than −10 dB. The matching of the impedance and/or reflection loss can be made in various ways. However, preferably this is realized solely through the shape and dimensions of the feeding line, such as the length and/or width of the feeding line, i.e. without any additional components.

Figure 5:
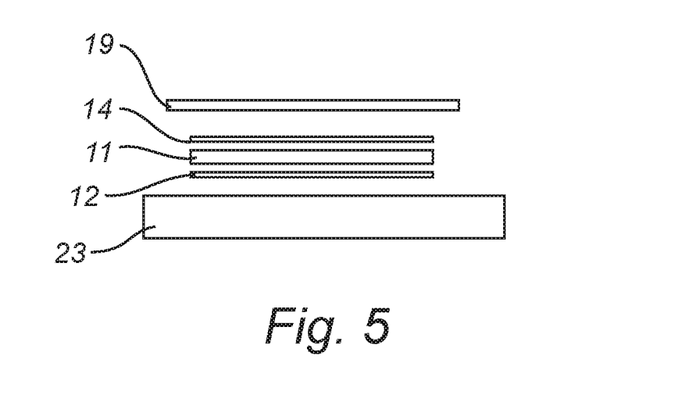
FIG. 5 is an exploded sideview, schematically illustrating the RFID reader antenna of FIG. 4.

As illustrated in the exploded view in FIG. 5, the ground plane 12 and the radiating element 14 can be arranged in layers on different sides of the dielectric substrate 11. However, it is also possible to arranged the ground plane 12 and the radiating element 14 in the same layer, and on the same side of the dielectric substrate 11.

The antenna may, as discussed in the foregoing, be connected to a shelf 23, e.g. by attachment by screws or the like. To this end, the antenna may also be provided with screw holes 18 or similar arrangements to facilitate the connection. Attachment by means of screws makes it easy to connect the antenna to any shelf, and also makes it easy to disconnect the antenna, for repair, service, replacement and the like. Other ways of connecting the antenna to the shelf are, however, also possible, such as by use of an adhesive. The antenna may also be formed as an integrated part on a side of the shelf, or even within the shelf. In the latter case, the material of the shelf itself may be serve as the dielectric substrate for the antenna.

A protective layer 19 may optionally be provided on one or both sides of the antenna. In the illustrative example of FIG. 5, such a protective layer is arranged on the side of the antenna facing away from the shelf.

The antenna is preferably configured for operation within the UHF range, and preferably in the range of 700-1400 MHz, and most preferably within the range of 860-960 MHz.

Figure 7:
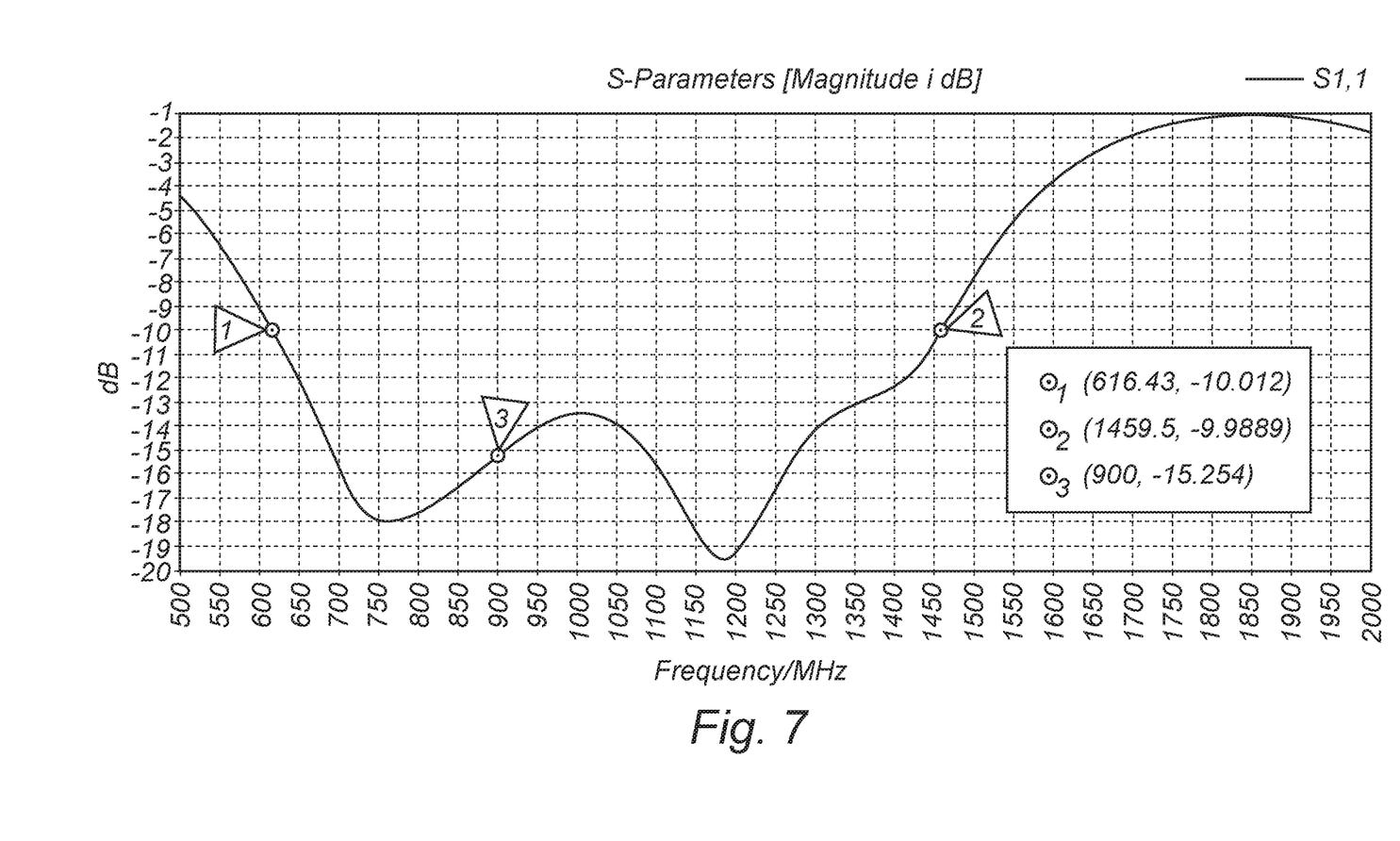
FIG. 7 is a diagram illustrating simulation results of impedance matching and return loss for the antenna of FIG. 4.

In a test simulation with the RFID reader antenna of FIG. 4, the impedance matching bandwidth was tested, from 500 MHz to 2000 MHz. The results are illustrated in the diagram of FIG. 7. It was found that a very good impedance matching, with very low return loss, was obtained over a broad frequency range covering conventionally used frequencies for RFID reading. In particular, it was found that the return loss was below −10 dB for all frequencies from 616 MHz and up to 1460 MHz. This indicates that the antenna is well suited for use as an RFID reader antenna.

Figure 8:
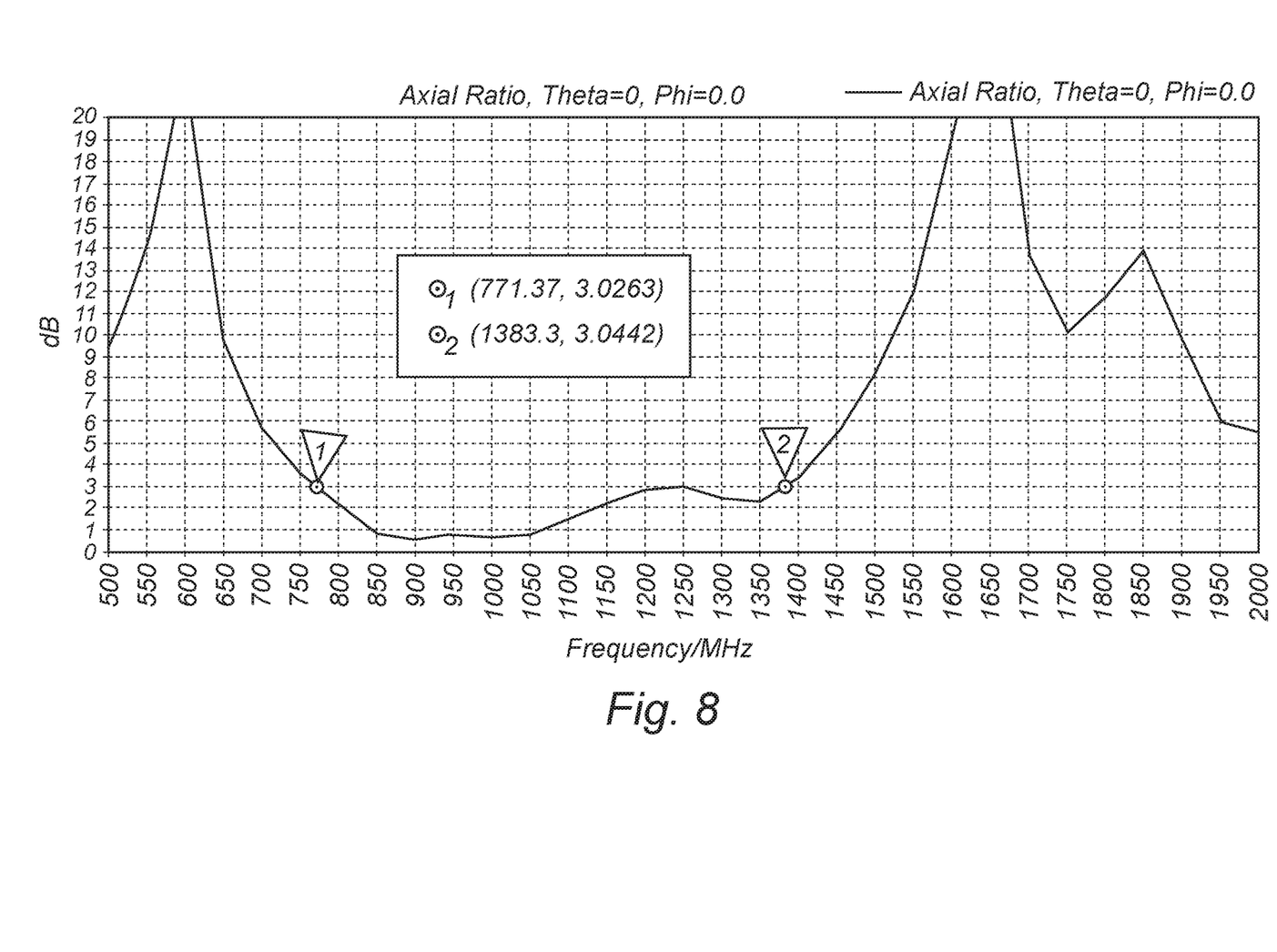
FIG. 8 is a diagram illustrating simulation results of cross polarization for the antenna of FIG. 4.

In a further test simulation with the same RFID reader antenna, the circular polarization was tested and evaluated over a frequency bandwidth extending from 500 to 2000 MHz. The results are illustrated in the diagram of FIG. 8. This was made by simulation and testing of the axial ratio. It was found that a very low axial ratio, indicating a high degree of circular polarization, was obtained over a broad frequency range covering conventionally used frequencies for RFID reading. In particular, it was found that the axial ratio was below 3 dB, i.e. indicating a very high degree of circular polarization, over a frequency band ranging from 770 MHz to 1383 MHz.

Figure 9:
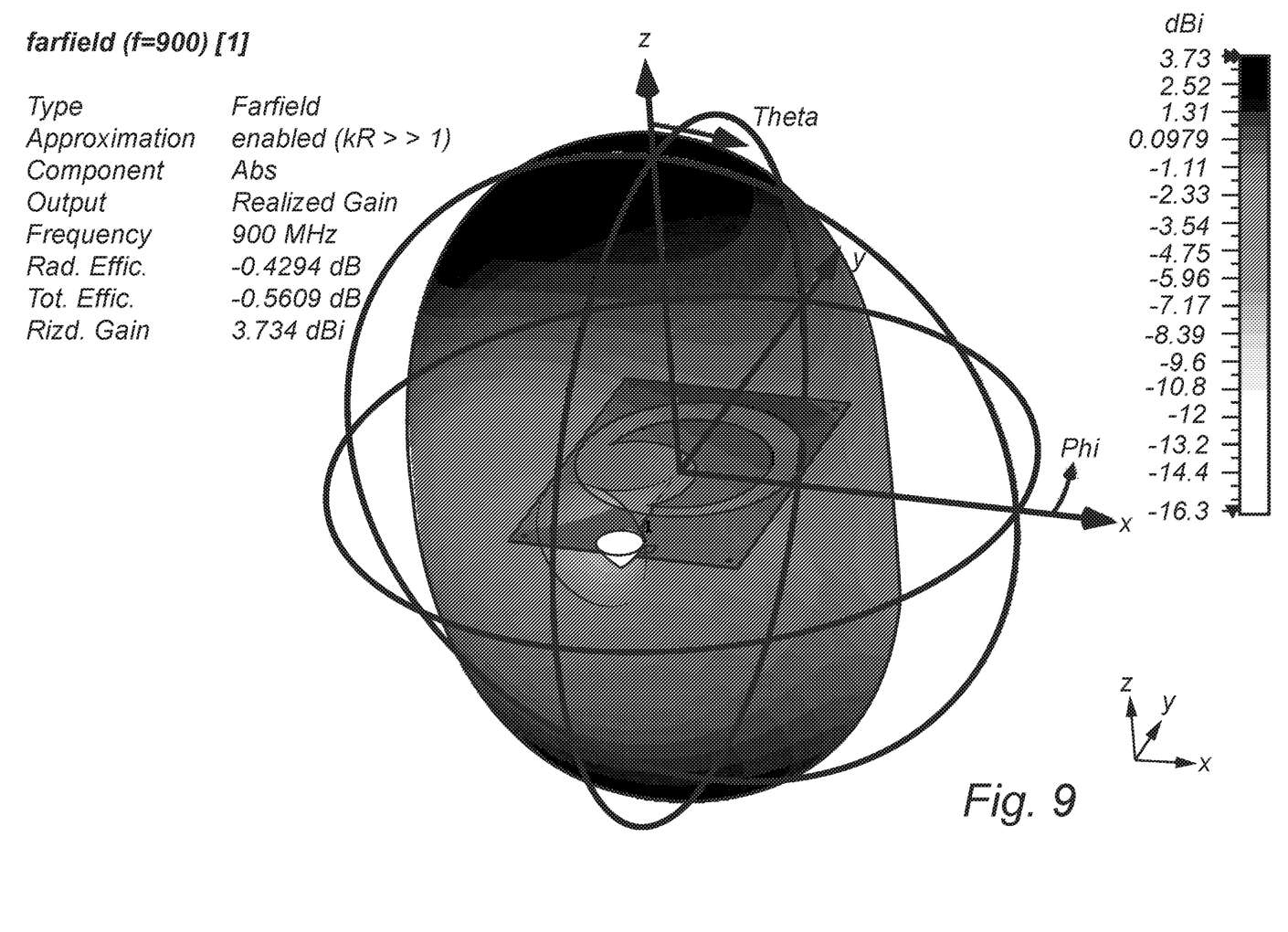
FIG. 9 is a 3D diagram illustrating simulation results of the farfield pattern and max gain for the antenna of FIG. 4.

In a further test simulation, the farfield pattern and the max gain was evaluated in all directions around the antenna, for a frequency of 900 MHz. The results of this is illustrated in the 3D diagram of FIG. 9. It was found that the emitted RF power was well distributed in all directions around the antenna, with a gain of at least −1 dBi in all directions. Further, the max gain, of 3.73 dBi or more, was found in the upward and downward directions, i.e. in directions perpendicular to the plane of the antenna. Thus, it was found that the antenna has very good omnidirectional characteristics, and with the max gain in a direction where it is most useful when the antenna is used in an intelligent cabinet.

Figure 10:
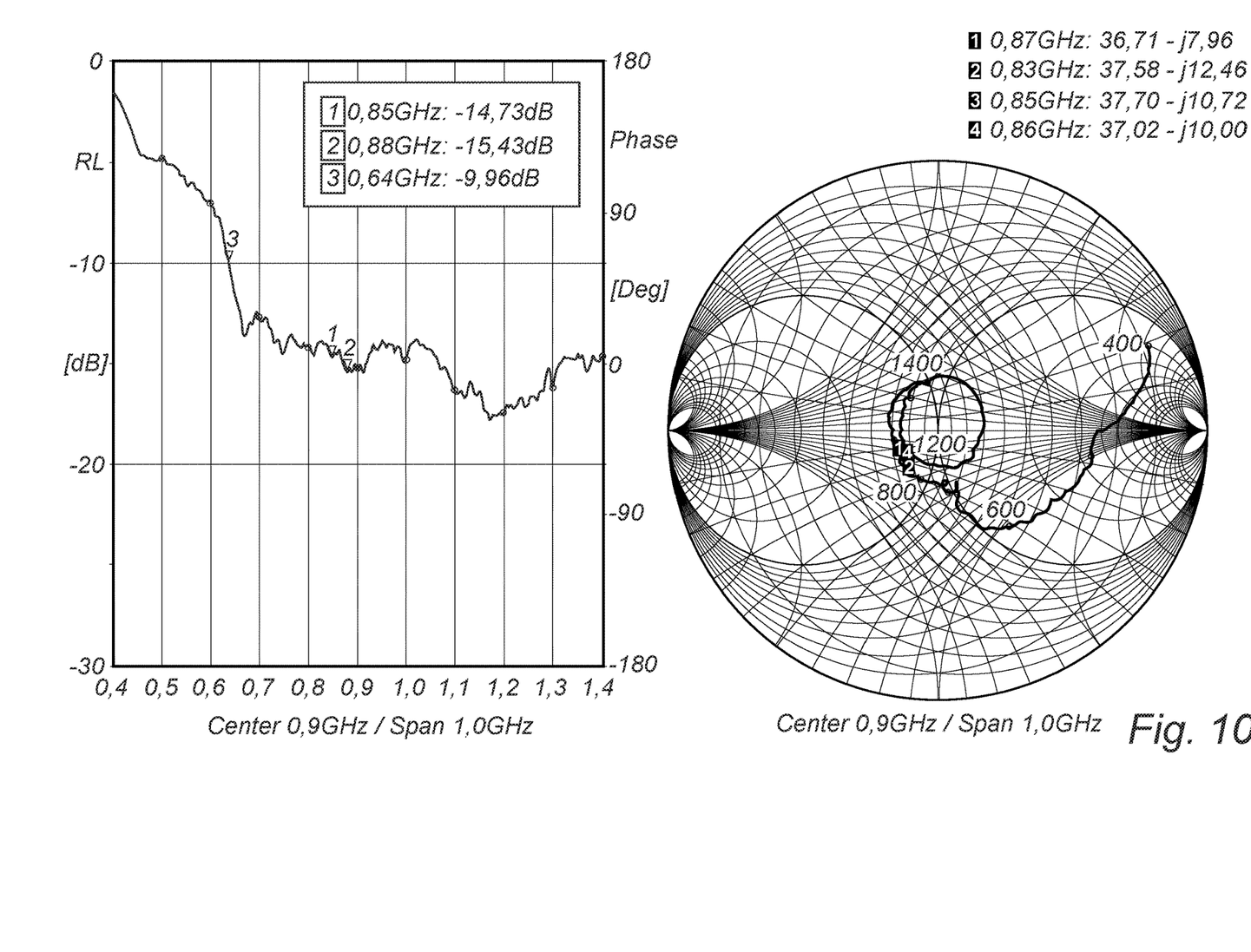
FIG. 10 is a diagram illustrating measurement results of impedance matching and return loss for the antenna of FIG. 4.

In an additional test, a prototype of the antenna of FIG. 4 was made and tested in relation to impedance matching. The impedance matching was tested from about 400 MHz to about 1400 MHz. The results of this test are shown in the diagram of FIG. 10. This test confirms the findings made in the simulation (discussed in relation to FIG. 7 above). In particular, it was confirmed that a very good impedance matching, with very low return loss, was obtained over a broad frequency range covering conventionally used frequencies for RFID reading. In particular, it was found that the return loss was below −10 dB for all frequencies from about 640 MHz and upwards. This again shows that the antenna is well suited for use as an RFID reader antenna.

The person skilled in the art realizes that the present invention is not limited to the above-described embodiments. For example, the general design of the ground plane and the radiating element may be varied in many ways. The antenna may further be adapted for different operational frequencies. The feeding may also be realized in various ways, and e.g. the feeding line may have different shapes and dimensions.

Such and other obvious modifications must be considered to be within the scope of the present invention, as it is defined by the appended claims. It should be noted that the above-described embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. An RFID reader antenna for use in an intelligent cabinet, the antenna configured to operate within an UHF band, the antenna comprising:
   a dielectric substrate;
   a ground plane provided on the dielectric substrate, said ground plane having an aperture forming an open area within the bounds of the ground plane; and
   a radiating element provided on the dielectric substrate in a plane parallel to said ground plane, the radiating element being arranged within the open area, when viewed from a direction perpendicular to said ground plane, and surrounded by the ground plane.

2. The RFID reader antenna of claim 1, wherein the aperture has a rounded circumference.

3. The RFID reader antenna of claim 1, wherein the ground plane is arranged on a first side of the dielectric substrate, and the radiating element is arranged on a second side of the dielectric substrate, said first and second sides being opposite to each other.

4. The RFID reader antenna of claim 1, wherein the antenna is configured for operation within the a range of 700-1400.

5. The RFID reader antenna of claim 1, wherein the radiating element is shaped as a concave region.

6. The RFID reader antenna of claim 5, wherein a feed line is connected to an apex of the concave region.

7. The RFID reader antenna of claim 1, wherein the antenna is configured to provide an omnidirectional radiation pattern.

8. The RFID reader antenna of claim 1, further comprising a feed line, forming an electric connection between an RF connector and the radiating element.

9. The RFID reader antenna of claim 8, wherein the feed line comprises an integrated loop arranged in proximate the RF connector.

10. The RFID reader antenna of claim 8, wherein the feed line and the radiating element provide an impedance within the range of 40-60 Ω at the frequency of operation, or a reflection loss of equal to or less than−10 Db, or both.

11. The RFID reader antenna of claim 1, wherein the radiating element is arranged free from any overlap with the ground plane, when viewed from a direction perpendicular to said ground plane.

12. The RFID reader antenna of claim 1, wherein for at least 50% of a length of a perimeter; of the radiating element, a distance between any point of the perimeter and a part of the ground plane being closest to said point is within a range of 2-50 mm.

13. The RFID reader antenna of claim 1, wherein a longest dimension of the ground plane has a dimension within a range of 100-300 mm.

14. The RFID reader antenna of claim 1, wherein a longest dimension of the radiating element has a dimension within a range of 50-200 mm.

15. An intelligent cabinet comprising:
   a housing with an internal cavity, and
   the RFID reader antenna in accordance with claim 1 arranged within said internal cavity.

16. The intelligent cabinet of claim 15, where the RFID reader antennas is arranged, connected to, or integrated with a shelf of said intelligent cabinet.

\* \* \* \* \*